United States Patent Office 3,293,259
Patented Dec. 20, 1966

3,293,259
CERTAIN 1-ARYLSULFONYL-1,2,4-TRIAZOLES
Milton Wolf, West Chester, Pa., assignor to American Home Products Corporation, New York, N.Y., a corporation of Delaware
No Drawing. Filed Aug. 13, 1965, Ser. No. 479,643
8 Claims. (Cl. 260—308)

This invention is directed to novel compounds classified in the art of organic chemistry as 1,2,4-triazoles and to a process for making these compounds.

In its composition aspect, the claimed invention resides in a composition of matter having a 1,2,4-triazole nucleus having in the 1- or 4-position a phenylsulfonyl substituent or its hereinafter disclosed equivalents.

Viewed in its process aspect, the claimed invention resides in the concept of reacting triazole with an arylsulfonyl halide in the presence of an acid scavenger such as a tertiary amine.

The tangible embodiments of the composition aspect of this invention possess the inherent physical properties of being relatively high melting yellowish to colorless solids, and substantially insoluble in water.

Examination of compounds produced by the hereinafter described process reveals data confirming the molecular structure hereinbefore set forth. For example, the nuclear magnetic resonance spectrum shows the environmental equivalence of the triazole atoms in the case of the 4-arylsulfonyl compounds, while the structure of the 1-arylsulfonyl compounds is confirmed by the magnetic non-equivalence of the triazole protons.

The aforementioned physical characteristics, taken together with the nature of the starting materials and the mode of synthesis positively confirm the structure of the compositions sought to be patented.

As determined by pharmacological evaluation using warm blooded animals, the claimed compounds exhibit the applied use characteristic of exerting qualitatively varying therapeutic effects as central nervous system depressants and as hypoglycemics.

The process and the compounds of the claimed invention are further elucidated in the following reaction scheme:

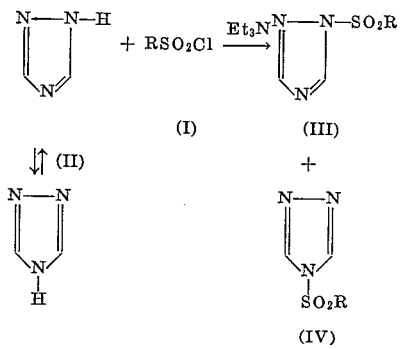

As shown above, the reaction whereby the claimed compounds are productd entails forming a solution of a 1,2,4-triazole (II) and an acid scavenger such as triethylamine in benzene. To this solution is added portionwise a solution of a phenylsulfonyl halide (I) in benzene. If this mixing results in an exothermic reaction, the reaction mixture is cooled to precipitate the halide which forms. This halide is filtered off and the filtrate is concentrated under vacuum to give the product. Where, with certain phenylsulfonyl halides, the reaction is not exothermic, heat must be supplied. It normally suffices to reflux the reaction mixture for about a half hour in order to complete the reaction. After this time ether and water are added to the reaction mixture in order to precipitate the product.

The claimed compounds can be purified by recrystallization from ethylacetate-cyclohexane or methylcyclohexane-benzene mixtures.

The 1,2,4-triazoles and the phenylsulfonyl halides used in making the claimed compounds are generally known or are readily prepared by procedures well known to those skilled in the art.

The triazoles used in making the claimed compounds can be unsubstituted or can have one or more alkyl, aryl or aralkyl groups in the 3- or the 5-position.

The phenylsulfonyl halide can be a benzenesulfonyl halide, such as the chloride, the bromide or the fluoride. Equivalent to the selected benzenesulfonyl halides are derivatives thereof having on any convenient position on the benzene ring substituents such as alkyl or alkoxy having up to 5 carbon atoms; halogen atoms such as chlorine or fluorine; similarly heteroalkyl sulfonyl halides such as 2-thiophene sulfonyl chloride can be used.

From the above discussion of the starting materials, it will be noted that correspondingly the claimed compounds can bear the enumerated substituents. Such substituted compounds are the full equivalents of the compounds specifically claimed herein and can be used for the same purposes.

The following examples set forth the best mode contemplated by the inventor for carrying out his invention.

*Example 1*

Five grams of 1,2,4-triazole in 125 ml. of benzene was dried by azeotropic distillation of moisture. The resultant solution (100 ml.) was cooled and treated with 7.4 g. of triethylamine. With stirring a solution of 12.8 g. of benzenesulfonyl chloride in 25 ml. of benzene was added dropwise. The precipitated triethylamine hydrochloride was removed and the remaining solution was concentrated in vacuo, leaving 12.8 g. of white solid, M.P. 105–108°. Upon recrystallization from ethyl acetate-cyclohexane there was obtained 9.6 g. of 1-phenylsulfonyl-1H-1,2,4-triazole, M.P. 109.5–110°.

Elemental analysis confirmed the empirical formula: $C_8H_7N_3O_2S$.

*Example 2*

A dry solution of 5 g. of 1,2,4-triazole in 100 ml. of benzene containing 10.1 ml. of triethylamine was slowly treated with 15 g. of p-methoxybenzenesulfonyl chloride in 30 ml. of benzene. The mixture was heated under reflux for ½ hour. Ether (50 ml.) and water (100 ml.) were added. Insoluble matter was filtered and recrystallized from ethylacetate-cyclohexane to afford 1.4 g. of 4-p-anisulfonyl-4H-1,2,4-triazole, M.P. 128–130°.

Elemental analysis confirmed the empirical formula for $C_9H_9N_3O_3S$.

The original filtrate was separated into an aqueous portion and an organic portion. The latter was evaporated in vacuo and the resultant solid was recrystallized from methylcyclohexane-benzene to afford 11.2 g. of 1-p-anisylsulfonyl-1H-1,2,4-triazole, M.P. 94–95°.

Elemental analysis confirmed the empirical formula for $C_9H_9N_3O_3S$.

By following the procedure of Example 1 the following 1-arylsulfonyl-1H-1,2,4-triazoles were prepared:

| Ex. | Starting Materials | Substituent in 1-Position | Solv. for Recrystallization | M.P. (° C.) |
|---|---|---|---|---|
| 3 | p-Toluenesulfonyl Chloride+1,2,4-Triazole | p-Tolylsulfonyl | Ethyl Acetate-Cyclohexane | 143–145 |
| 4 | p-Chlorobenzenesulfonyl Chloride+1,2,4-Triazole. | p-Chlorophenylsulfonyl. | Ethyl Acetate | 127–128 |
| 5 | p-Methoxybenzenesulfonyl Chloride+3,5-Dimethyl-1,2,4-Triazole. | p-Anisylsulfonyl | Cyclohexane | 107–108 |
| 6 | Benzenesulfonyl Chloride+3,5-Dimethyl-1,2,4-Triazole. | Phenylsulfonyl | Tetrahydrofuran | 97– 97.5 |
| 7 | p-Fluorobenzenesulfonyl Chloride+3,5-Dimethyl-1,2,4-Triazole. | p-Fluorophenylsulfonyl. | Cyclohexane | 109–109.5 |
| 8 | p-Fluorobenzenesulfonyl Chloride+1,2,4-Triazole. | ----do---- | ----do---- | 81– 83 |
| 9 | 2,4-xylenesulfonyl Chloride+1,2,4-Triazole | 2,4-xylylsulfonyl | ----do---- | 80– 81 |
| 10 | 2,4-xylenesulfonyl Chloride+3,5-Dimethyl-1,2,4-Triazole. | ----do---- | * | 51– 53 |
| 11 | By proceeding as in Ex. 1, using 1,2,4-triazole and 2-thiophenesulfonyl chloride, 1-(2-thienylsulfonyl)-1H-1,2,4-triazole is obtained. | | | |
| 12 | By proceeding as in Ex. 1, using 3,5-dimethyl-1,2,4-triazole and α-toluenesulfonyl chloride, 1-benzylsulfonyl-1H-1,2,4-triazole is obtained. | | | |

*Sample was distilled (B.P. 144–153/0.5 mm.).

The claimed compounds and their acid addition salts can be used either alone or in combination with other active compounds. They also may be produced in the usual pharmaceutical forms with inert carriers in the form of tablets, suspensions or the like.

What is claimed is:
1. The compounds selected from the group consisting of

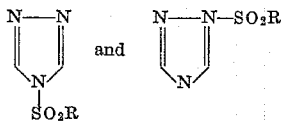

and the acid-addition salts thereof, wherein R is selected from the group consisting of thienyl, phenyl and X-substituted phenyl, wherein X is selected from the group consisting of lower alkyl, lower alkoxy and halo.

2. 1-phenylsulfonyl-1,2,4-triazole.
3. 4-p-anisylsulfonyl-4H-1,2,4-triazole.
4. 1-p-anisylsulfonyl-1,2,4-triazole.
5. 1-p-tolylsulfonyl-1,2,4-triazole.
6. 1-p-chlorosulfonyl-1,2,4-triazole.
7. 1-p-fluorophenylsulfonyl-1,2,4-triazole.
8. 2,4-xylylsulfonyl-1,2,4-triazole.

References Cited by the Examiner
UNITED STATES PATENTS
3,180,866  4/1965  Horstmann et al. ____ 260—256.5
3,207,758  9/1965  Worffel et al. _____ 260—256.5

OTHER REFERENCES
Yamase et al., Chem. Abstracts, vol. 61, page 4515 (1964).

ALEX MAZEL, *Primary Examiner.*

HENRY R. JILES, *Examiner.*

ALTON D. ROLLINS, *Assistant Examiner.*